(12) United States Patent
Ash et al.

(10) Patent No.: US 10,337,764 B2
(45) Date of Patent: Jul. 2, 2019

(54) CONDUIT MOUNT ASSEMBLY

(71) Applicant: Ironridge, Inc., Hayward, CA (US)

(72) Inventors: Jon Ash, Phoenix, AZ (US); Clayton Robert Rietz, Phoenix, AZ (US); Anumeha Narain, Paradise Valley, AZ (US)

(73) Assignee: IronRidge, Inc., Hayward, CA (US)

( * ) Notice: Subject to any disclaimer, the term of this patent is extended or adjusted under 35 U.S.C. 154(b) by 0 days.

(21) Appl. No.: 15/488,392

(22) Filed: Apr. 14, 2017

(65) Prior Publication Data

US 2017/0299102 A1    Oct. 19, 2017

Related U.S. Application Data

(60) Provisional application No. 62/322,681, filed on Apr. 14, 2016.

(51) Int. Cl.
| | | |
|---|---|---|
| *F16L 39/04* | (2006.01) | |
| *F24S 25/00* | (2018.01) | |
| *F16L 3/10* | (2006.01) | |
| *H02S 40/30* | (2014.01) | |
| *F16M 13/02* | (2006.01) | |
| *F24J 2/52* | (2006.01) | |
| *E04D 13/04* | (2006.01) | |
| *F16B 9/02* | (2006.01) | |

(52) U.S. Cl.
CPC .............. *F24S 25/00* (2018.05); *F16L 3/105* (2013.01); *H02S 40/30* (2014.12); *F16B 9/026* (2013.01); *Y02B 10/20* (2013.01)

(58) Field of Classification Search
CPC ...... E04D 13/0404; F16B 9/026; F16L 39/04; F16M 13/02; F16M 13/022; F24J 2/52
USPC .................... 52/27, 302.6, 58, 698
See application file for complete search history.

(56) References Cited

U.S. PATENT DOCUMENTS

| | | | | |
|---|---|---|---|---|
| 784,979 | A * | 3/1905 | Bruce ...................... | F16L 3/24 248/72 |
| 2,442,833 | A * | 6/1948 | Watkins .................... | F16L 3/00 248/49 |
| 2,938,742 | A * | 5/1960 | Teator .................. | H02G 3/0683 285/149.1 |

(Continued)

FOREIGN PATENT DOCUMENTS

| | | | | |
|---|---|---|---|---|
| DE | 1236620 | B * | 3/1967 | .............. F16L 3/105 |
| DE | 1988431 | | 6/1968 | |

(Continued)

*Primary Examiner* — Joshua J Michener
*Assistant Examiner* — Joseph J. Sadlon
(74) *Attorney, Agent, or Firm* — Lance C. Venable; Law Office of Lance C. Venable, PLLC

(57) ABSTRACT

An assembly for fastening a conduit to a flashing structure that is typically secured to a shingled roof. The apparatus includes an adjustable clamp that can be secured to a cap on the flashing. A conduit is laid on top of the cap and the adjustable clamp is positioned on top of the conduit and is snapped in place along the perimeter of the cap. An adjustable bolt is threaded through the top of the clamp with a curved saddle that resides beneath the clamp and conforms to the shape of the conduit's outer surface. The bolt can then be adjusted to tighten the conduit to the cap. An exemplary use of the clamp involves securing conduit for running electrical wiring throughout a solar panel array.

8 Claims, 12 Drawing Sheets

(56) References Cited

U.S. PATENT DOCUMENTS

| | | | | |
|---|---|---|---|---|
| 3,208,560 | A * | 9/1965 | Cote | F16B 37/045 403/252 |
| 3,279,014 | A * | 10/1966 | Fischer | F16L 3/1025 24/115 R |
| 3,416,270 | A * | 12/1968 | McHugh | F16M 1/00 248/687 |
| 4,367,857 | A * | 1/1983 | McCarthy | F16L 3/00 248/74.1 |
| 4,998,691 | A * | 3/1991 | Brown | F16L 3/1016 248/68.1 |
| 5,022,614 | A | 6/1991 | Rinderer | |
| 5,215,281 | A * | 6/1993 | Sherman | F16L 3/1207 248/219.4 |
| 5,217,191 | A * | 6/1993 | Smith | F16L 3/18 248/49 |
| 5,595,366 | A * | 1/1997 | Cusimano | E02D 27/34 248/354.3 |
| 5,685,508 | A * | 11/1997 | Smith | F16L 3/14 248/49 |
| 6,041,823 | A * | 3/2000 | Kusama | F16B 2/10 138/99 |
| 6,070,836 | A | 6/2000 | Battie et al. | |
| 6,089,421 | A * | 7/2000 | Cho | A42C 1/06 223/12 |
| 6,536,717 | B2 * | 3/2003 | Parker | F16L 3/1016 248/346.01 |
| 7,073,755 | B2 * | 7/2006 | Michaud | F16L 3/105 248/72 |
| 7,195,038 | B2 * | 3/2007 | Friedline | F16L 3/085 138/106 |
| 7,328,874 | B2 * | 2/2008 | Tenma | F16L 3/105 248/65 |
| 7,762,027 | B1 * | 7/2010 | Wentworth | F24J 2/5245 126/621 |
| 7,857,269 | B2 * | 12/2010 | Plaisted | F16L 3/127 248/237 |
| 8,226,057 | B2 * | 7/2012 | Ao | H01Q 1/1228 248/218.4 |
| 8,250,829 | B2 * | 8/2012 | McPheeters | E04D 13/1476 52/710 |
| 8,356,778 | B2 * | 1/2013 | Birli | F16L 3/127 248/65 |
| 8,448,405 | B2 * | 5/2013 | Schaefer | E04C 3/06 52/60 |
| 8,479,455 | B2 * | 7/2013 | Schaefer | H02G 3/088 174/564 |
| 8,505,864 | B1 * | 8/2013 | Taylor | F24S 25/636 248/237 |
| 8,601,754 | B2 * | 12/2013 | Jenkins | E04D 13/16 52/173.3 |
| 8,661,765 | B2 * | 3/2014 | Schaefer | A47B 96/14 52/239 |
| 8,756,881 | B2 | 6/2014 | West et al. | |
| 8,826,618 | B2 | 9/2014 | Stearns | |
| 8,845,406 | B2 * | 9/2014 | McIver | F24F 7/02 454/367 |
| 8,910,448 | B2 * | 12/2014 | Okada | E04D 1/30 52/705 |
| 8,936,224 | B2 * | 1/2015 | Bartelt-Muszynski | F24S 25/65 248/237 |
| 8,991,116 | B2 * | 3/2015 | Richardson | H02S 20/23 52/173.3 |
| 9,010,038 | B1 | 4/2015 | Stearns et al. | |
| 9,010,041 | B2 * | 4/2015 | Danning | B23P 11/00 52/173.3 |
| 9,121,545 | B2 * | 9/2015 | Stanley | F16M 13/022 |
| 9,126,290 | B2 * | 9/2015 | Buttress | B23K 9/0286 |
| 9,447,988 | B2 * | 9/2016 | Stearns | F24J 2/00 |
| 9,677,598 | B2 * | 6/2017 | Wang | F16M 13/022 |
| 9,755,571 | B2 * | 9/2017 | Almy | H02S 20/23 |
| 9,774,292 | B2 * | 9/2017 | Stearns | E04D 13/10 |
| 9,903,532 | B2 * | 2/2018 | Kovacs | B25B 5/003 |
| 2006/0284027 | A1 * | 12/2006 | Smith | F16L 3/04 248/65 |
| 2015/0280638 | A1 | 10/2015 | Stephan et al. | |
| 2015/0288320 | A1 | 10/2015 | Stearns et al. | |
| 2015/0323101 | A1 | 11/2015 | Hobson | |

FOREIGN PATENT DOCUMENTS

| | | | | |
|---|---|---|---|---|
| EP | 0555187 | A1 * | 8/1993 | F16L 3/24 |
| EP | 2146160 | A1 * | 1/2010 | F24J 2/045 |

* cited by examiner

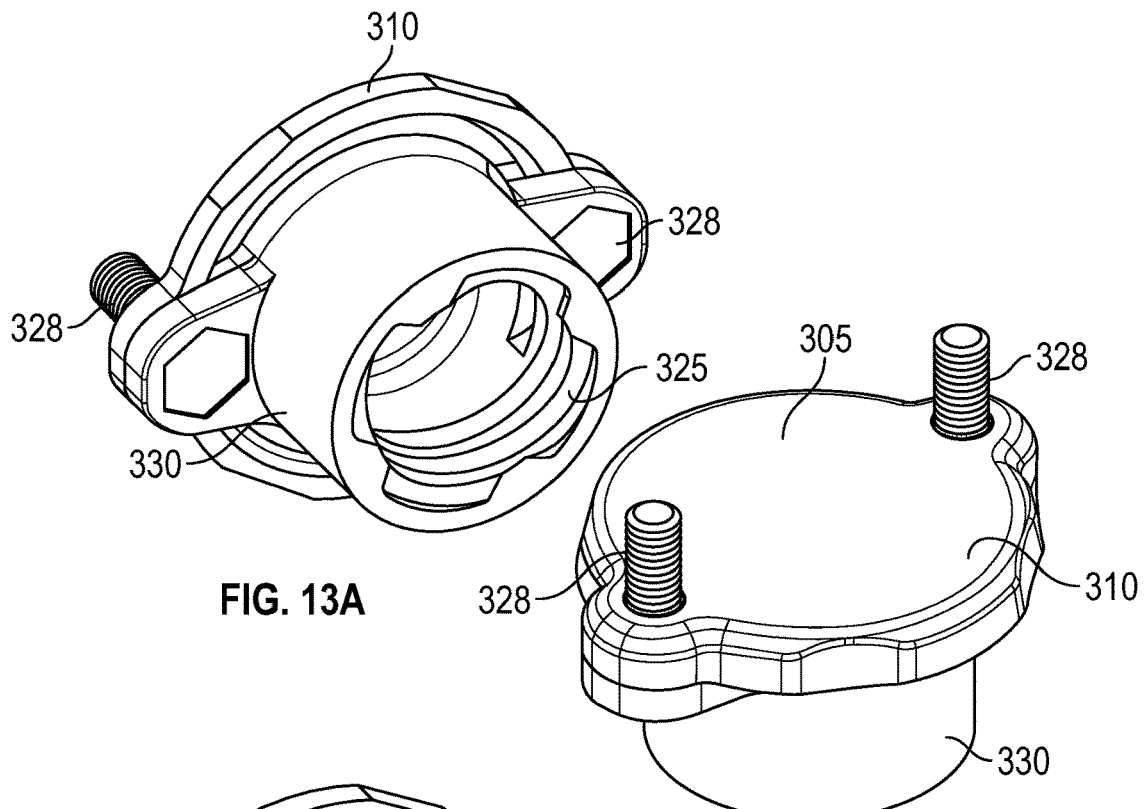
FIG. 13A
FIG. 13B
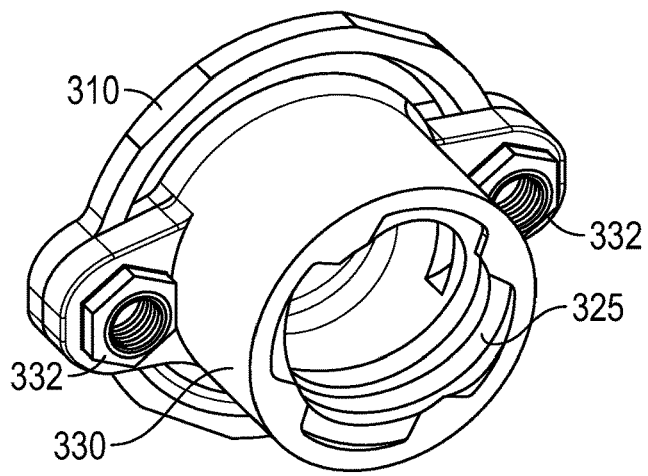
FIG. 14A
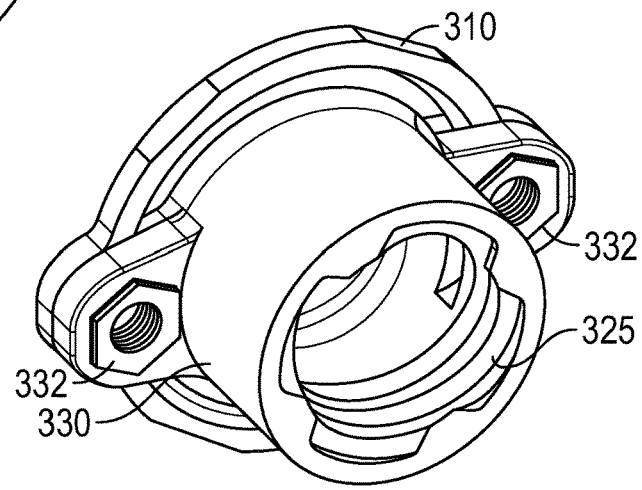
FIG. 14B

CONDUIT MOUNT ASSEMBLY

BACKGROUND OF INVENTION

Field of the Invention

The present invention generally relates to an apparatus for fastening a conduit to a flashing structure that is typically secured to a shingled roof. More specifically, the apparatus includes an adjustable clamp that can be secured to a cap on the flashing. In an exemplary embodiment, a conduit is laid on top of the cap and the adjustable clamp is positioned on top of the conduit and is snapped in place along the perimeter of the cap. An adjustable bolt is threaded through the top of the clamp with a curved saddle that resides beneath the clamp and conforms to the shape of the conduit's outer surface. The bolt can then be adjusted to tighten the conduit to the cap. An exemplary use of the clamp involves securing rows of conduits for running electrical wiring throughout a solar panel array next to, but unconnected to the flashings that are used to support the mounts for the solar panels.

Alternate exemplary embodiments of the adjustable clamp, the cap, and the assembly for providing a way to secure the conduit are also disclosed.

Description of the Related Art

Any discussion of the prior art in the specification should in no way be considered as an admission that the prior art is widely known or forms part of common general knowledge in the field.

The installation of solar panel arrays on residential roofs can be arduous and time-consuming. Depending on the array design, the components required to install the array can make the installation process even more difficult. In a typical array, several electrical cables are used to deliver power from the solar panels to electrical storage units away from the array. One way to provide this is to use conduits to secure, protect, and hide the cables from plain view. The present assembly provides a way for delivering the conduit from the array to the storage units that is both efficient and aesthetically advantageous over the prior art.

The patent application publication issued to Hobson (U.S. 2015/0323101) discloses a line clamp that uses base and an enveloping clamp that holds a cable that includes a securing clamp to lock the enveloping clamp to the base. This device, however, is not adaptable to a solar panel flashing mechanism and does not disclose a combination of a flashing cap combined with an adjustable clamp for securing conduit of various diameters.

In another related prior art patent issued to Rinderer (U.S. Pat. No. 5,022,614), a one-piece conduit clip is disclosed. Rinderer discloses a clamp that secures a conduit using an adjustable clamp. But as in Hobson, the apparatus does not disclose a flashing cap that is adaptable to a solar panel flashing mechanism combined with an adjustable clamp for securing conduit of various diameters.

The present invention overcomes these limitations and offers a solution that provides an apparatus that utilizes a u-shaped clamp with an adjustable securing mechanism that fastens conduit of varying diameters in combination with a locking cap that fits over a flashed roof attachment. When used on multiple flashings, multiple rows of conduit or other similar components can be secured and connected between solar panel arrays and power storage devices away from the arrays that require minimal parts and tools that is easy to install, use, and manufacture.

SUMMARY OF THE INVENTION

The invention is summarized below only for purposes of introducing embodiments of the invention. The ultimate scope of the invention is to be limited only to the claims that follow the specification.

It is an object of this invention to provide an assembly for securing a conduit to a flashed roof attachment.

It is a further object of this invention to provide a clamp that is coupled to a cap that enables a conduit to fit between the cap and the clamp.

It is a further object of this invention that the clamp is generally u-shaped or c-shaped.

It is a further object of this invention that the cap is capable of being secured to a flashing.

It is a further object of this invention that the clamp comprises a clamping bolt that coupled to the clamp and used to secure the conduit to the cap.

It is a further object of this invention that a saddle is coupled to one end of clamping bolt and can engage and conform to the shape of the conduit.

It is a further object of this invention that the clamping bolt is adjustable through an opening in the clamp.

It is a further object of this invention that the clamp comprises hooks that are coupled to a groove in the cap.

It is a further object of this invention that the cap can be secured to the flashing in multiple directional orientations.

It is a further object of this invention that the cap is secured to the flashing by rotating it into a locked position on the flashing.

It is a further object of this invention that the conduit is secured to a plurality of caps by securing an elongated channel to a plurality of caps and securing the conduit onto the elongated channel.

It is a further object of this invention to use securing bolts to secure the elongated channel to the plurality of caps through apertures in the elongated channel and a plurality of holes in the plurality of caps.

A person with ordinary skill in the relevant art would know that any shape or size of the elements described below may be adopted. Any combinations of suitable number, shape, and size of the elements described below may be used. Also, any materials suitable to achieve the object of the current invention may be chosen as well.

BRIEF DESCRIPTION OF THE DRAWINGS

A more complete understanding of the present invention may be derived by referring to the detailed description and claims when considered with the following illustrative figures. In the following figures, like reference numbers refer to similar elements and steps throughout the figures.

FIGS. 13a and 13b illustrate perspective views of the alternate embodiment of the cap shown in FIGS. 12a and 12b showing the securing bolts being inserted from the bottom of the cap holes.

FIGS. 14a and 14b illustrate perspective bottom views of the cap shown in FIGS. 13a and 13b showing nuts inserted into the hexagonal holes for receiving securing bots from the top of the cap.

FIG. 16 illustrates a cross-sectional view of the conduit guide being secured on top of an exemplary cap shown in FIG. 10a.

DETAILED DESCRIPTION OF THE INVENTION

In the following description, and for the purposes of explanation, numerous specific details are provided to thoroughly understand the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed embodiments may be applied. The full scope of the invention is not limited to the example(s) that are described below.

Figure 1:
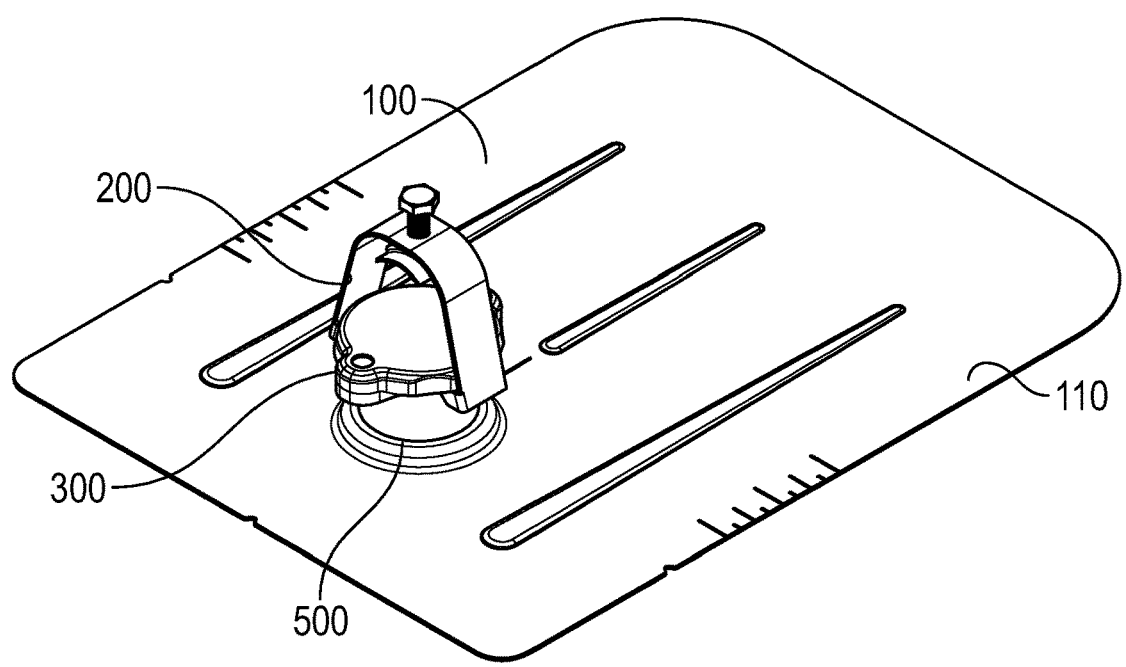
FIG. 1 illustrates a perspective view of an exemplary conduit mount assembly.
Figure 8:
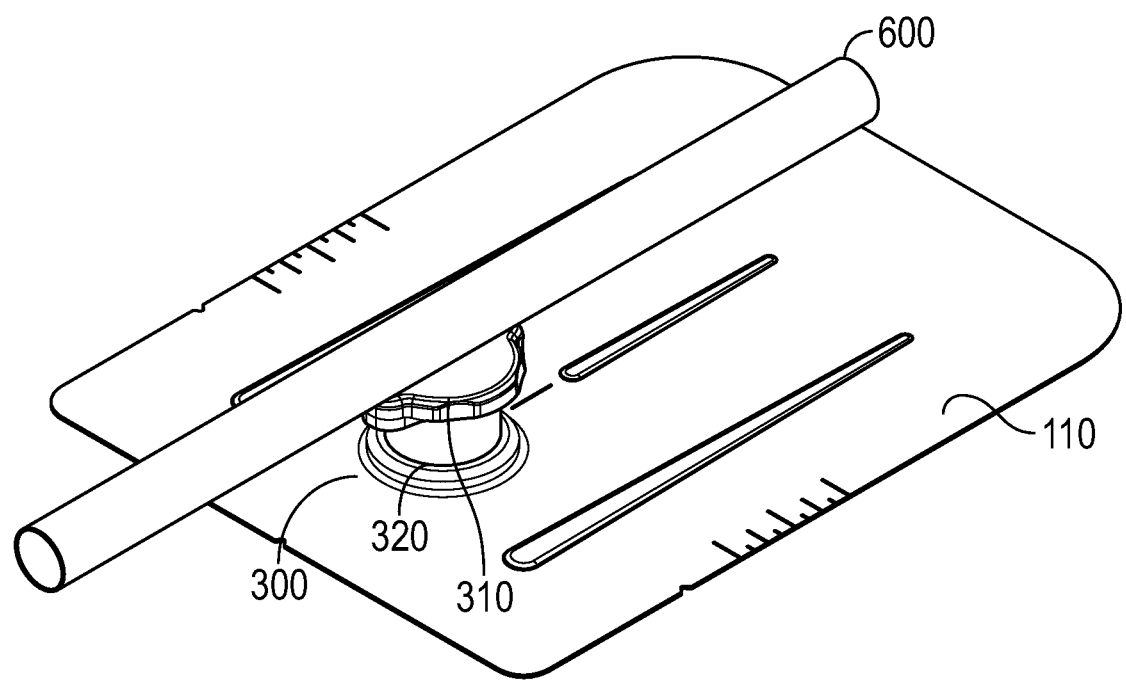
FIG. 8 is a perspective view of an exemplary conduit shown lying on top of the cap illustrated in FIG. 7.
Figures 9A, 9B:
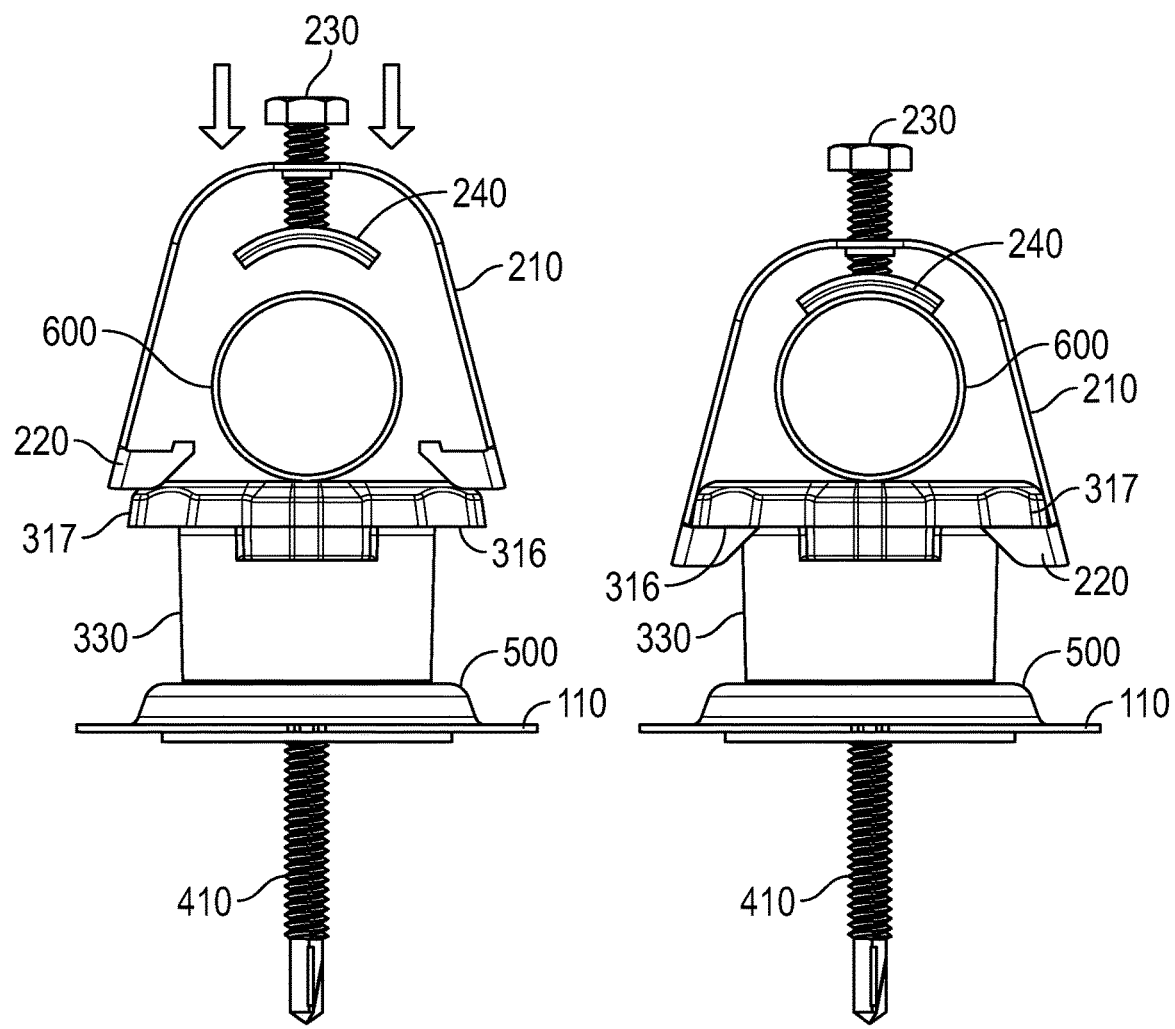
FIG. 9a illustrates a side view of the adjustable clamp shown in FIG. 3a prior to securing it to the cap of FIG. 7.
FIG. 9b illustrates the same side view in FIG. 9a showing the adjustable clamp in a secured position on the cap.

FIG. 1 shows a perspective view of an exemplary embodiment of a conduit clamp assembly 100 that is secured to a flashing 110. The flashing 110 is typically installed on a shingled roof. The conduit clamp assembly 100 includes an adjustable conduit clamp 200 and a conduit cap 300. When fully assembled and in use, the assembly 100 provides a way for installing conduit 600 along multiple conduit clamp assemblies 100 on flashings 110 as shown in FIGS. 8-9b. This enables electrical wiring to be delivered from a solar panel module to a storage device in an efficient manner that can hide the conduit from plain view in a way that is anchored to the roof.

Figure 2:
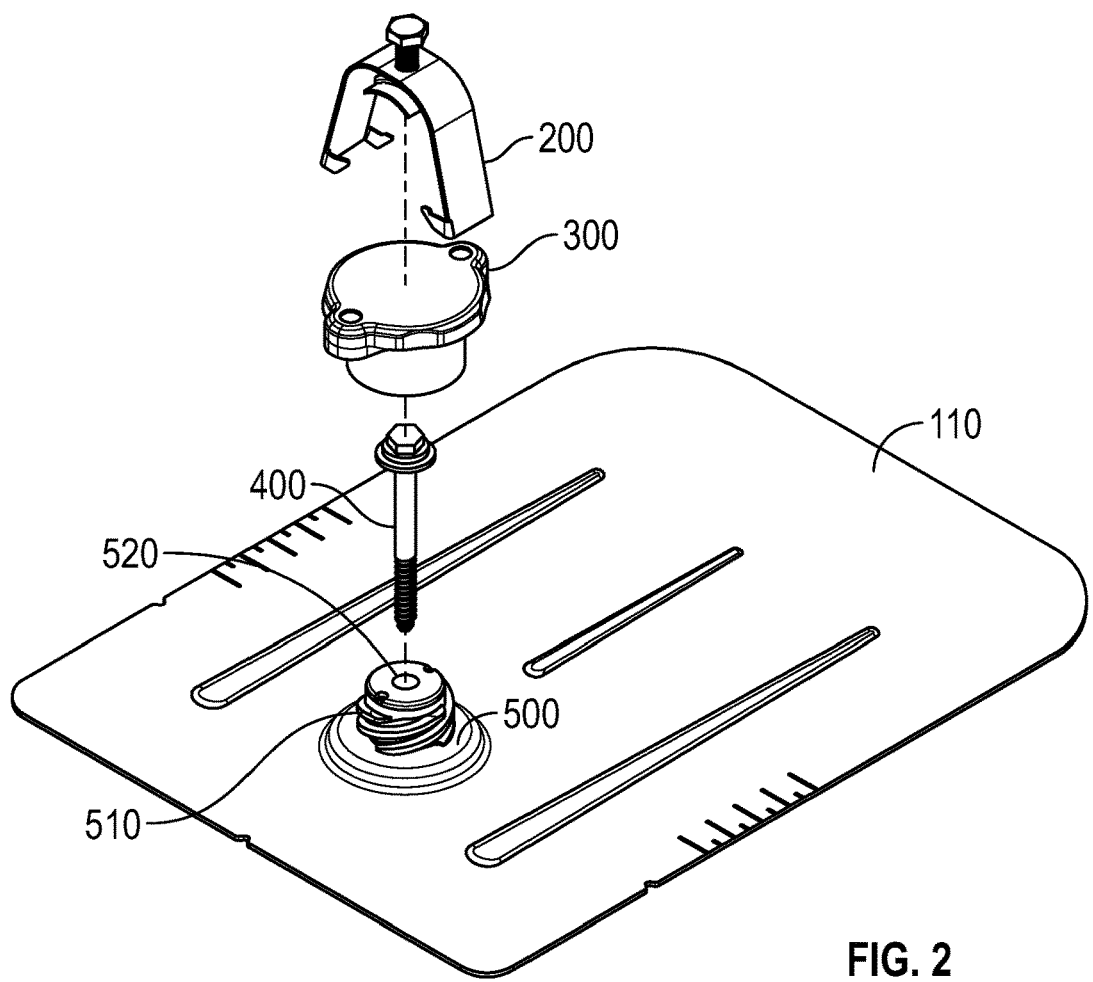
FIG. 2 illustrates a perspective exploded view of the exemplary conduit mount assembly shown in FIG. 1.

FIG. 2 illustrates an exploded view of FIG. 1 and shows the assembly 100 in more detail. The base 500 of the flashing 110 includes a threaded connector 510. The exemplary embodiment shown is an Ironridge, Inc. FlashFoot 2 product, but any suitable flashing with a compatible connector that can receive a cap is acceptable. A screw 400 is used to secure the flashing 110 to a roof by inserting the screw 400 through an connector opening 520 in the threaded connector 510. Once secured, the conduit cap 300 is fastened to the threaded connector 510 by rotating it into a locked position along the threads of the connector 510. The conduit clamp 200 is then secured to the conduit cap 300 by pressing it downward, or pulling it axially down the conduit onto the side 317 as shown and will be described in FIGS. 9a-9b.

Figure 3A:
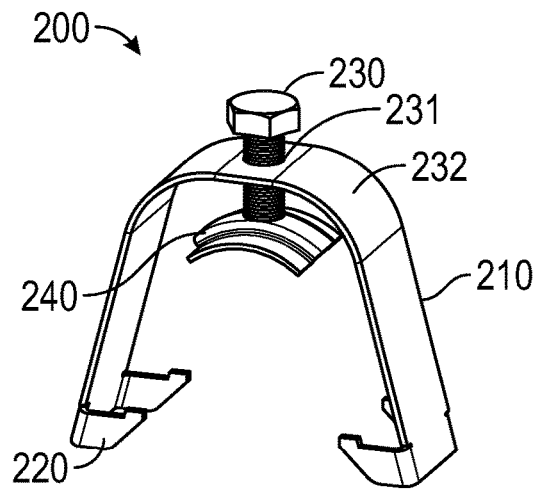
FIGS. 3*a*-3*d* illustrate perspective views of four exemplary embodiments of an adjustable clamp in the assembly of FIG. 1.
Figure 3B:
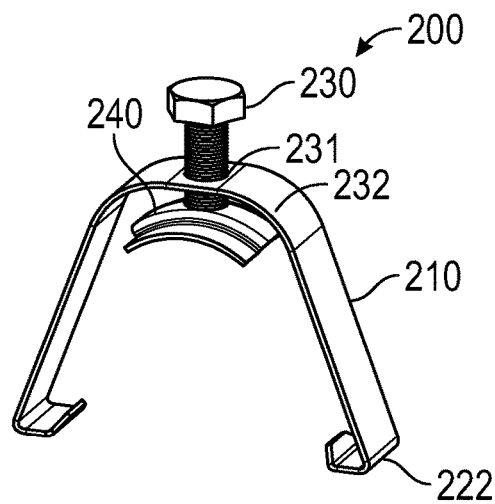
Figure 3C:
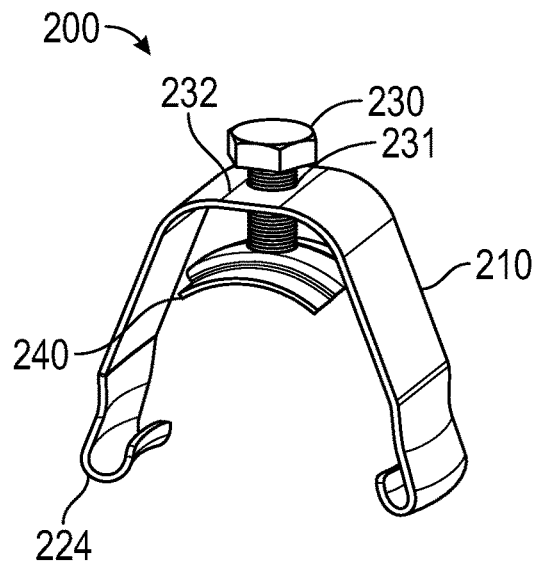
Figure 3D:
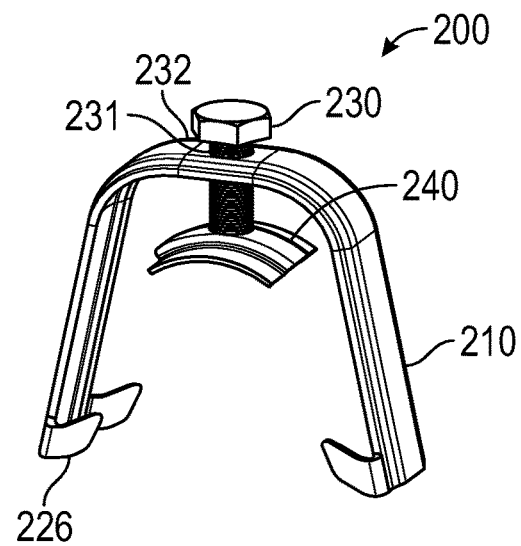

FIGS. 3a-3d illustrate four exemplary embodiments of the conduit clamp 200. The clamp 200 includes a generally u-shaped or c-shaped (the terms are used interchangeably) body 210 with a clamping bolt 230 that is inserted through an opening 231 on the body 210. In this embodiment, the opening 231 is on the top end 232 of the body, but it is feasible to provide the opening 231 on other portions of the body 210. In these embodiments, the clamping bolt 230 is a standard threaded hexagonal bolt, but any suitably shaped bolt is also acceptable, and the opening 231 is threaded for rotatably coupling the clamping bolt 230 through the opening 231, but other suitable means to secure the clamping bolt 230 to the clamp can be used as well. On the terminating end of the clamping bolt 230 is a saddle 240. In this exemplary embodiment, the saddle 240 is rounded or arced and generally conforms to the shape of a typical cylindrically shaped conduit, but it can be of any suitable shape just so that it is capable of securing engaging and stabilizing the conduit from moving laterally along the cap 300. The clamping bolt 230 can be adjusted vertically up or down by rotating it, which allows the saddle 240 to secure conduits with varying diameters. As shown in each of these figures, each edge of the clamp body 210 includes at least one hook (220, 222, 224, and 226). These hooks are used as locking apparatuses to snap the clamp 200 to the cap 300 as will be described further in FIGS. 9a-9b. In FIG. 3a, each end of the body 210 includes a pair of hooks 220. FIG. 3d also illustrates an alternate embodiment with slightly different-shaped hooks 226. FIGS. 3b and 3c illustrate a single-hook embodiment 222 and 224 respectively with each of these hooks having different variations of j-shaped hooks. The clamp bodies 210 shown in FIGS. 3a-3d are all generally u-shaped or c-shaped, but the shape can be of any suitable form with rounded or squared top ends 232 or slightly varying leg shapes as shown, for example in FIG. 3c, as long as the clamp 200 is capable of snapping onto the sides of the cap 300.

Figure 4:
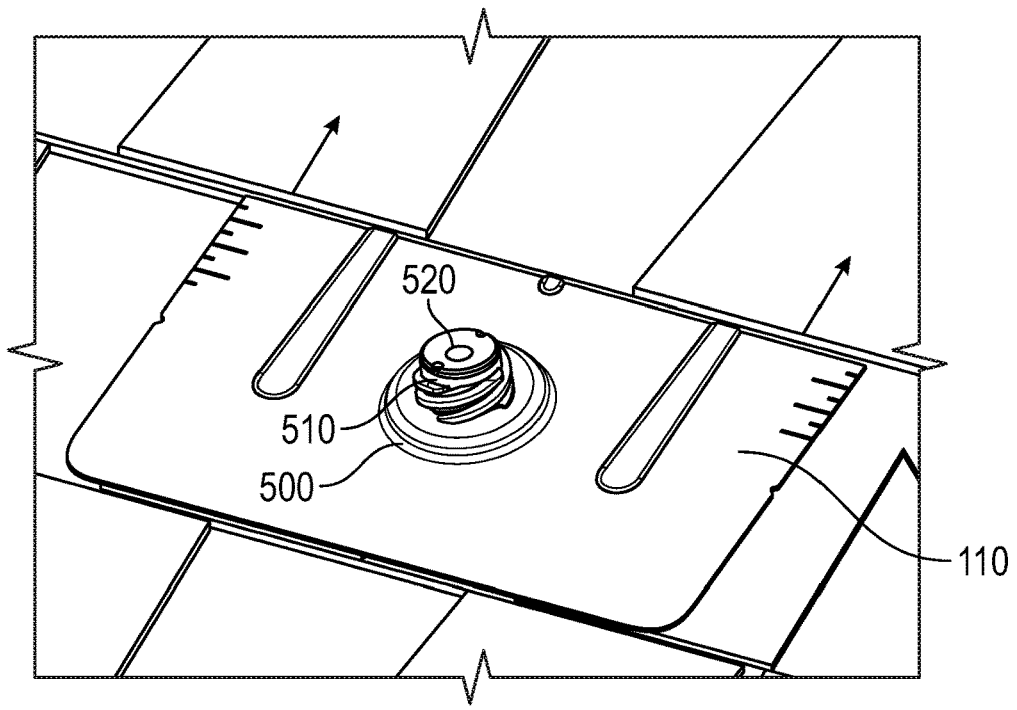
FIG. 4 illustrates a perspective view of an exemplary flashing with a base that includes a threaded connector that is installed on a shingled roof.
Figure 5:
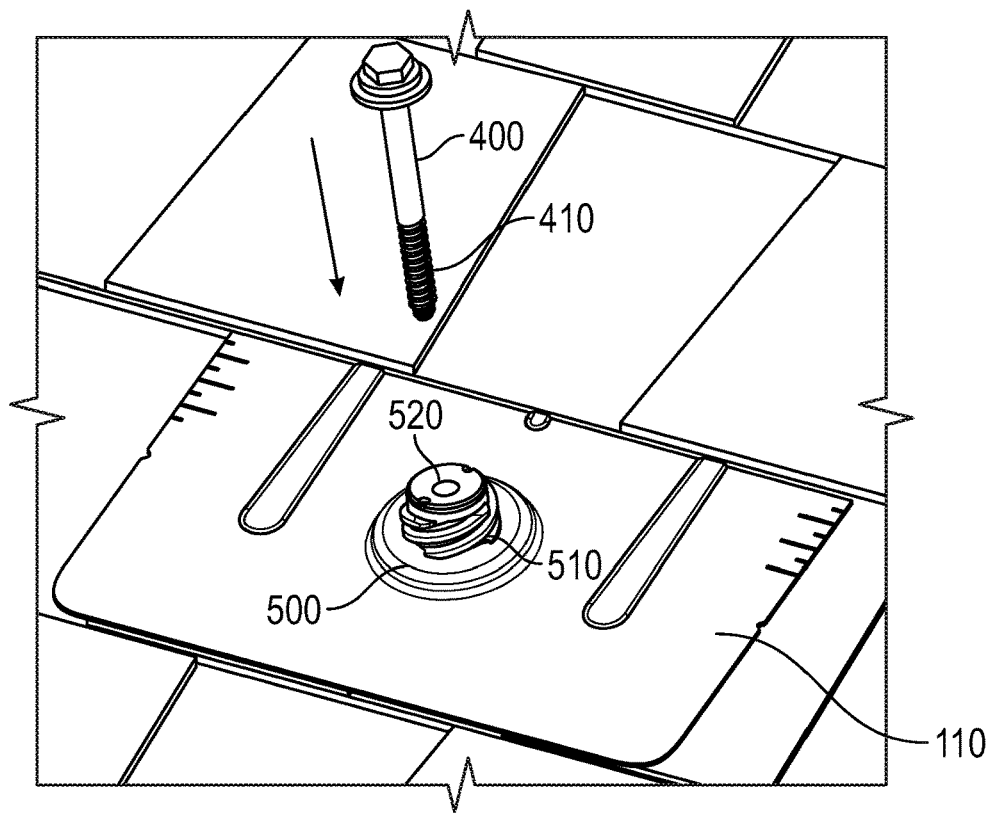
FIG. 5 illustrates a perspective exploded view of the same flashing shown in FIG. 4 with an exemplary screw that is used to secure the flashing to the roof through the threaded connector.
Figure 6:
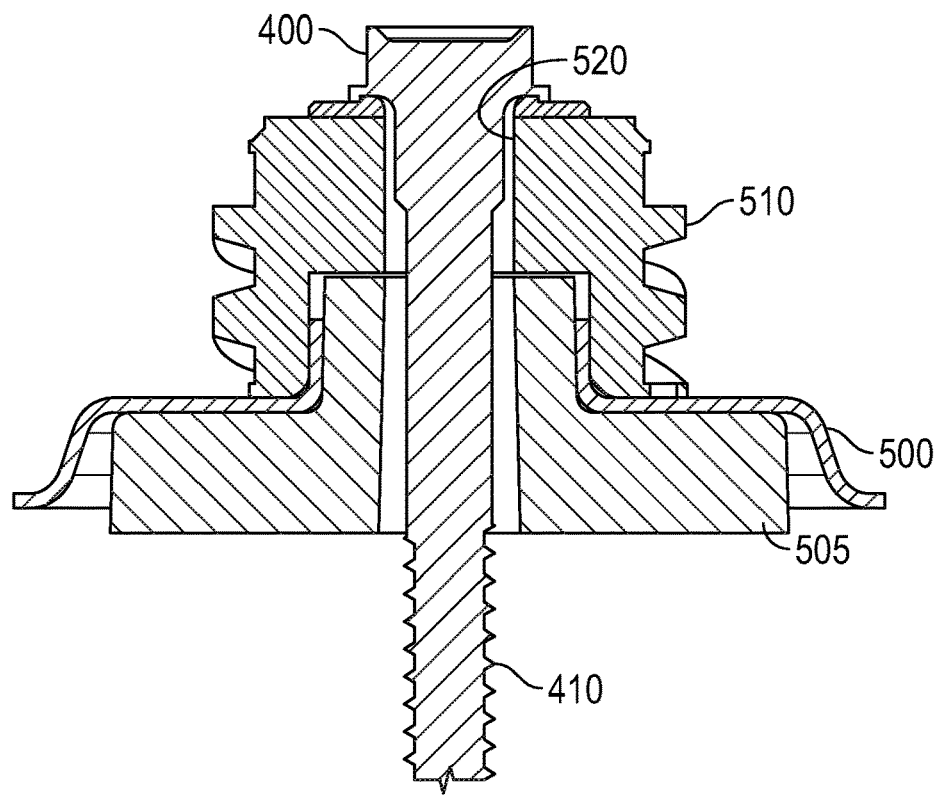
FIG. 6 illustrates a cross-sectional view of the threaded connector of the flashing shown in FIG. 4 with the screw fully inserted through the threaded connector.

FIGS. 4 and 5 illustrate the flashing 110 installed on a typical shingled roof. One side of the flashing 110 is inserted between successive shingles and then as shown in FIG. 5, the screw 400 is inserted through the connector opening 520 of the threaded connector 510 and into the roof so that the flashing 110 is secured tightly to the roof. A typical securing screw 400 is threaded 410 on one end, although any suitable screw that can be secured through the connector opening 520 in the connector 510 is acceptable. FIG. 6 shows a cross-sectional view of how the connector 510 and the base 500. This view also includes a sealed portion 505 that includes a load distribution plate 508 and includes the area between the connector 510 and the distribution plate 508 of the flashing 110 and is typically pre-fabricated in the manufacturing process of the flashing to provide greater protection against leaking.

Figure 7:
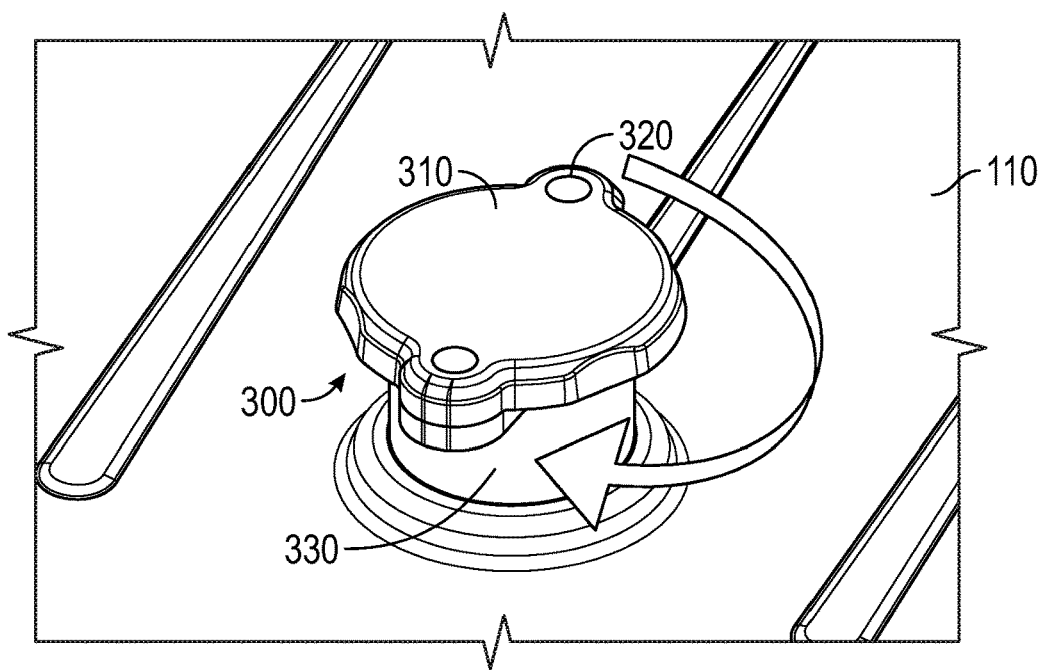
FIG. 7 illustrates a perspective view of a cap that is secured to the threaded connector on the flashing shown in FIG. 4.
Figure 10A:
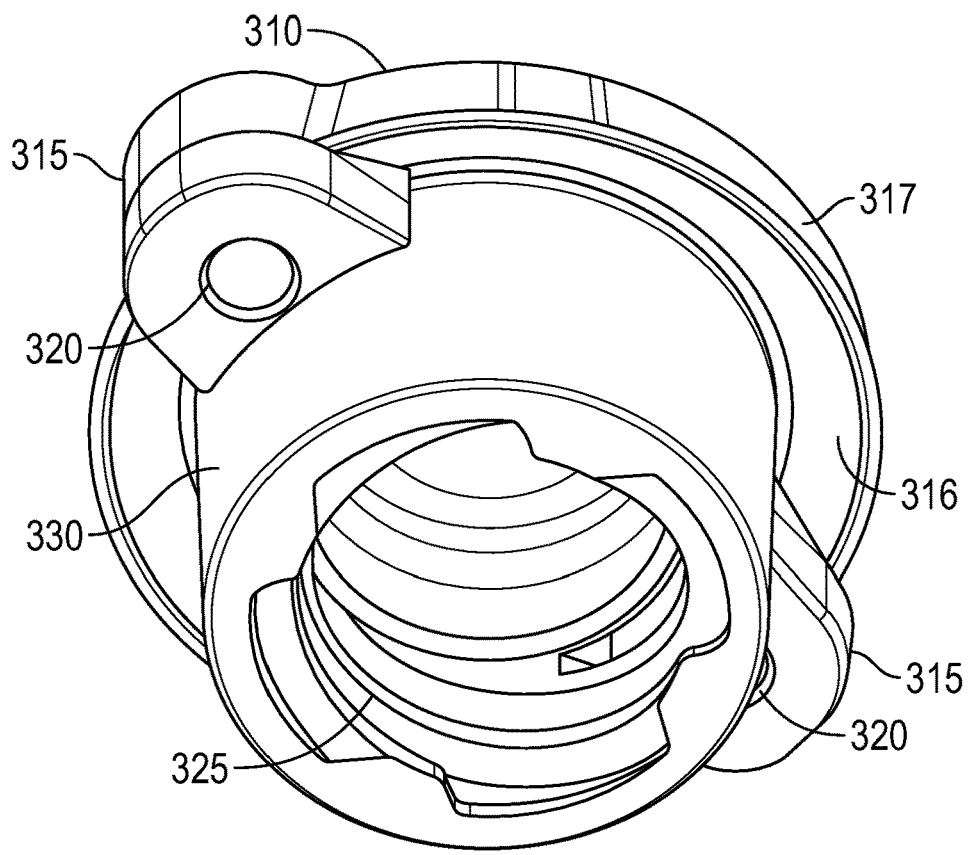
FIG. 10a illustrates a perspective bottom view of the cap shown in FIG. 7 with threaded holes on the sides for receiving securing bolts.
Figure 10B:
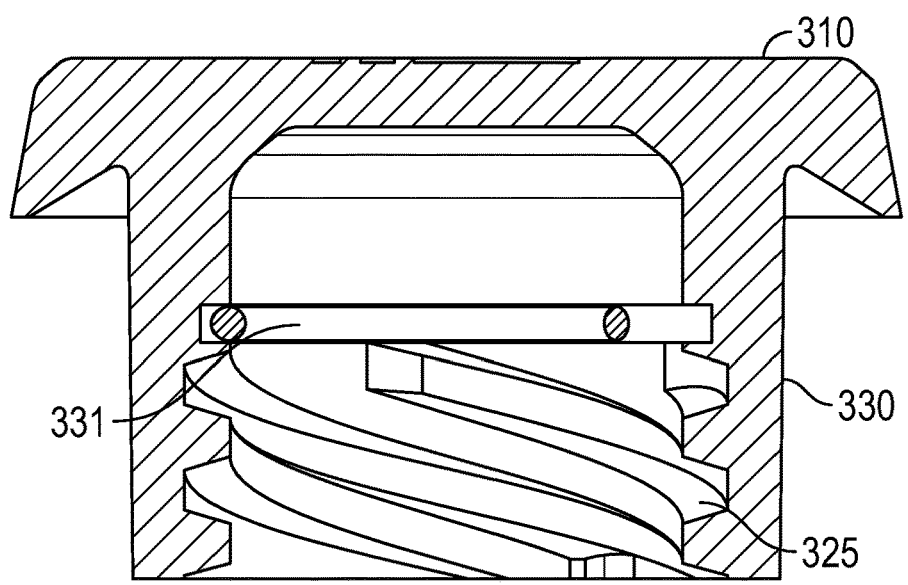
FIG. 10b illustrates a cross-sectional view of the cap.
Figure 12A:
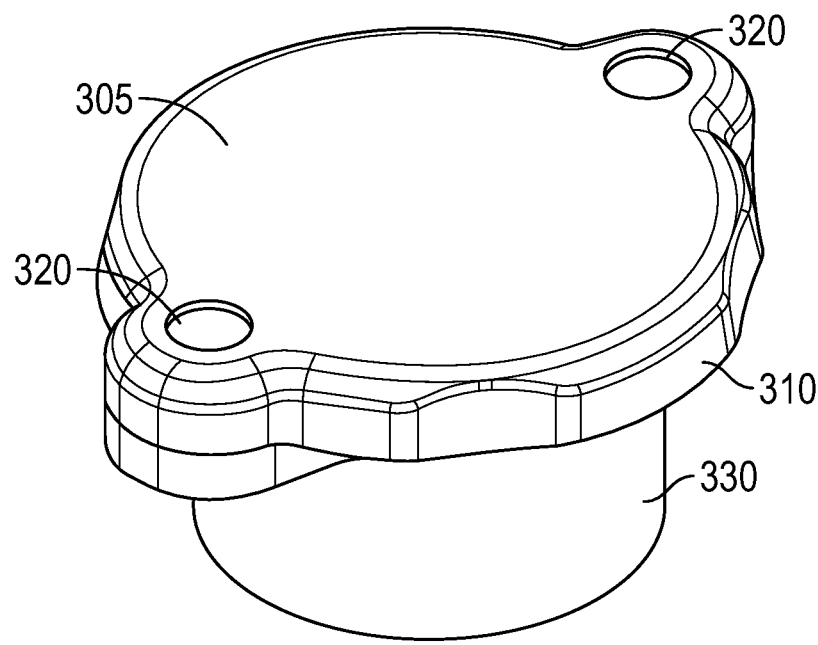
FIGS. 12a and 12b illustrate top and bottom views of another exemplary embodiment of a cap with holes on the sides for receiving securing bolts and nuts.

FIGS. 10a and 10b illustrate the details of the exemplary cap 300. As shown in FIG. 10a, the cap 300 includes a top head 310 that further comprises a top face or surface 305 (as shown in FIG. 12a) and an optional pair of cap ends 315. In this embodiment, the top head 310 is generally round although other suitable shapes can be used. The cap ends 315 extend or protrude outward from the head 310 on the top face 305 although it is also feasible for the ends to be part of a head 310 with a uniform diameter. It should also be understood that the cap ends 315 are included in this embodiment, but are not required to secure the conduit 600 in the embodiment using the clamp 200 as shown, for example, in FIGS. 9a-9b. The head 310 also includes a side 317 that extends downward around the perimeter of the head 310 and forms a recessed area or grove 316 that will subsequently receive the hooks (220, 222, 224, or 226) when the clamp 200 is secured. The cap ends 315 also enable easier gripping of the cap 300 so that it can be rotated. Each of the cap ends 315 include a hole 320 that can receive a securing bolt as described in FIG. 16. The hole 320 may be threaded or include a threaded insert. The cap 300 also includes a base 330 that is generally cylindrical in shape but can also be other suitable shapes. This exemplary embodiment of the base 330 is also hollow and includes a threaded portion 325 on the inside of the base 330 such that the threads are adapted to conform to the threads on the connector 510 as shown in FIG. 6. The cap 300 also includes a snap channel and ring 331 so that when the cap 300 is rotated into place on the connector 510 as shown in FIG. 7, the cap 300 will snap into place when it locks onto the connector 510.

Once the cap 300 is secured to the connector 510, FIG. 8 illustrates the next step of laying an exemplary conduit 600 on top of the top surface 305 of the top head 310 of the cap 300. The conduit 600 can be of any suitable shape, but it is typically cylindrical as shown so that it can conform to the shape of the arced or curved saddle 240.

FIGS. 9a and 9b illustrate the final step in securing the conduit 600 to the cap 300. As shown in FIG. 9a, the cap 300 and clamp 200 of FIG. 3a is used to demonstrate this step. The clamp 200 is placed on top of the cap 300 so that the hooks 220 rest on the top face 305 of the cap. Typically, the body 210 of the clamp is made of a resilient material that enables the legs of the body 210 to extend outward and return to their default position once no outward force is applied to the legs. In this exemplary embodiment, the hooks 220 can be secured at any points along the top face 305 of the cap except for the cap ends 315. The installer than applies a downward force on the top of the clamp 200 so that the hooks 220 extend outward and snap into place in the groove 316 as shown in FIG. 9b. Once the hooks 220 are snapped into place, the clamping bolt 230 is then rotated so that the arced saddle 240 can be moved downward and engage the conduit 600 so that it secures the conduit 600 in place on the top face 305 of the cap 300. The clamps 200 can be also be pulled sideways along the conduit 600 until the hooks 220 snap into the groove 316.

Figure 11A:
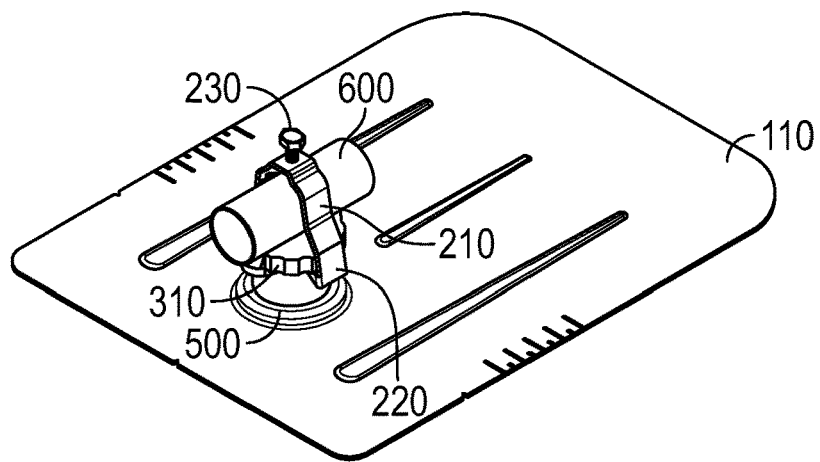
FIGS. 11a-11c illustrate perspective views of an exemplary conduit clamp assembly with the conduit positioned at different angles.
Figure 11B:
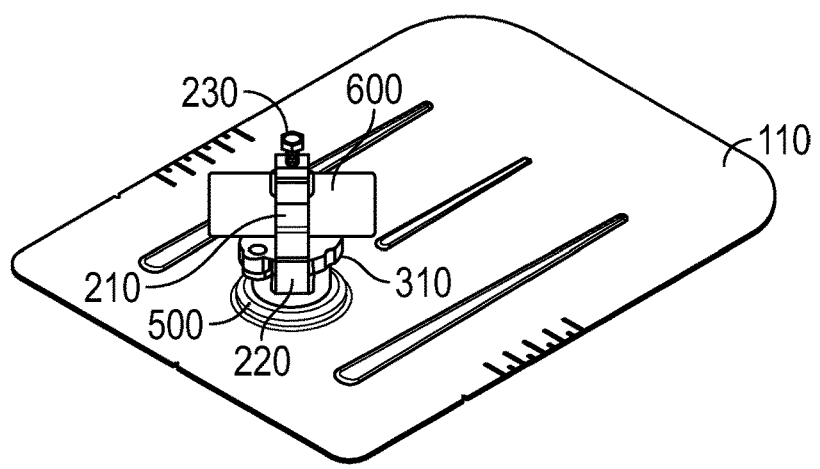
Figure 11C:
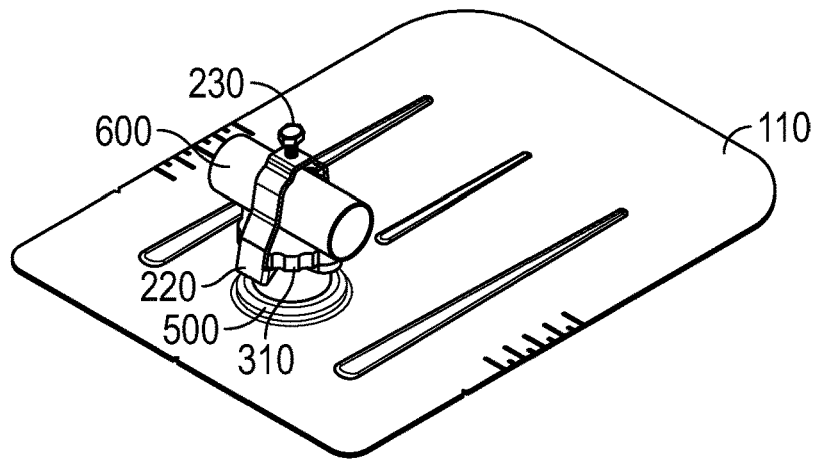

FIGS. 11a-11c illustrate various locations that the clamp 200 can be placed so that the conduit 600 can be positioned around the full 360 degrees of the cap 300. This is typically done by rotating cap 300 on the flashing to the locked position, which is typically so that the cap ends 315 are aligned in a North/South or an East/West direction (but either directions could be used as well), and then rotating the clamp 200 around the groove 316 of the cap 300, to a desired location, which enables the conduit 600 to be aligned at any angle with respect to the flashing 110.

Figure 15:
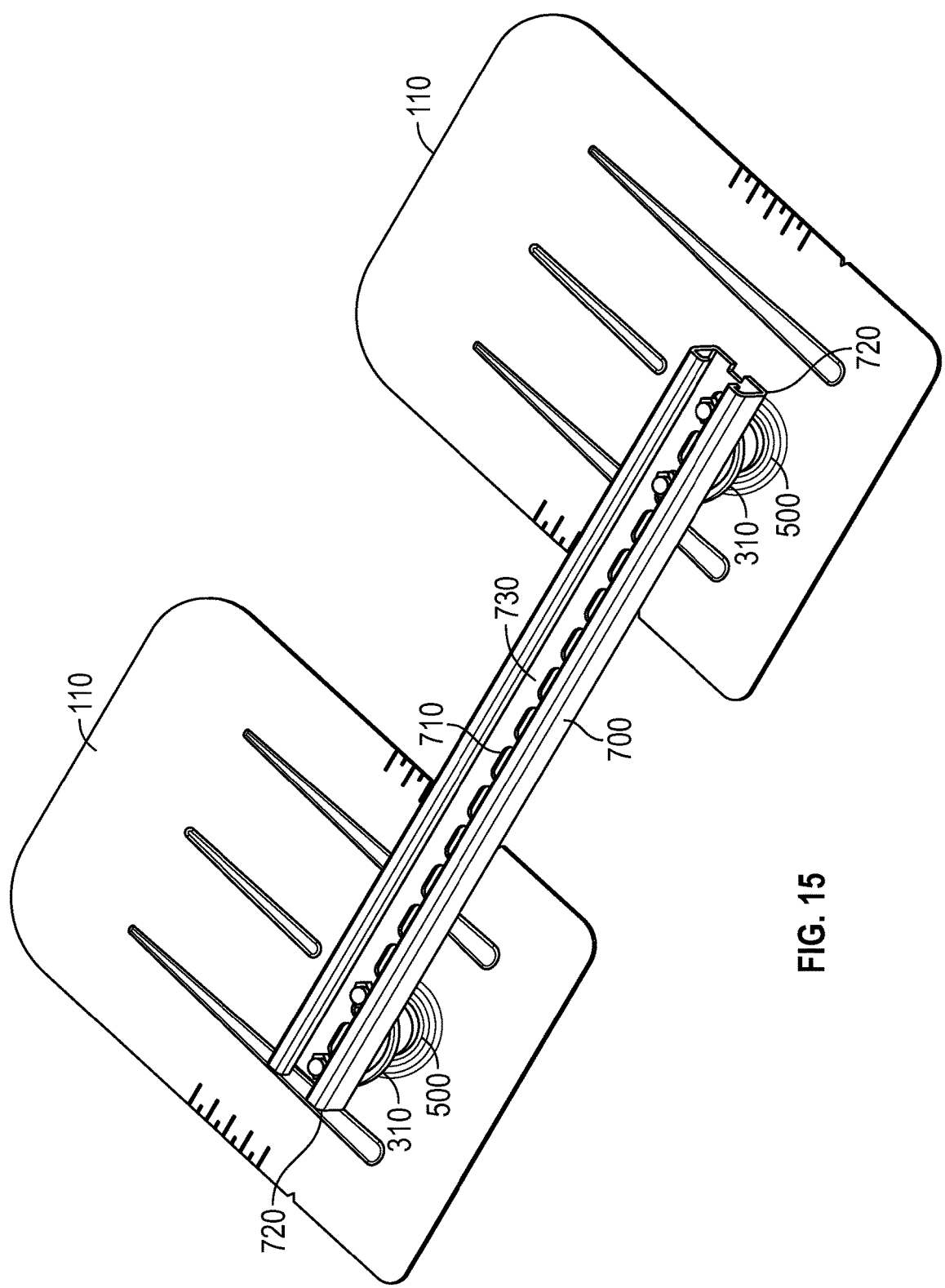
FIG. 15 illustrates a perspective view of a conduit guide being secured on top of the caps shown in FIGS. 10a, 13a-14b.

FIG. 15 illustrates an alternate exemplary embodiment of an assembly for installing and securing a conduit 600 in a top-down fashion between flashings 110. An elongated channel 700 is secured to a pair of conduit caps 300 on flashings 110 as shown. The elongated channel 700 can be a strut channel, or any suitable elongated channel that includes apertures 710 to allow for securing bolts. The elongated channel 700 is secured to the top faces 305 of the caps 300 by using securing bolts like, for example, hex bolts 328 as shown in 13a and 13b through apertures 710 on the respective channel ends 720 of the elongated channel 700 and through holes 320 as shown in FIG. 12a. It is also understood that the elongated channel 700 can be secured to the caps by using an adhesive or hooks on the channel 700 that can be clamped on similar to the clamping action described in FIGS. 9a-9b. The channel ends 720 are not restricted to the edges of the elongated channel, but can also include the interior portions of the elongated channel 700. Once the elongated channel 700 is secured to the caps 300, multiple conduits 600 or other components such as boxes, etc. can be secured on top of the elongated channel 700 using hardware (not shown).

Figure 12B:
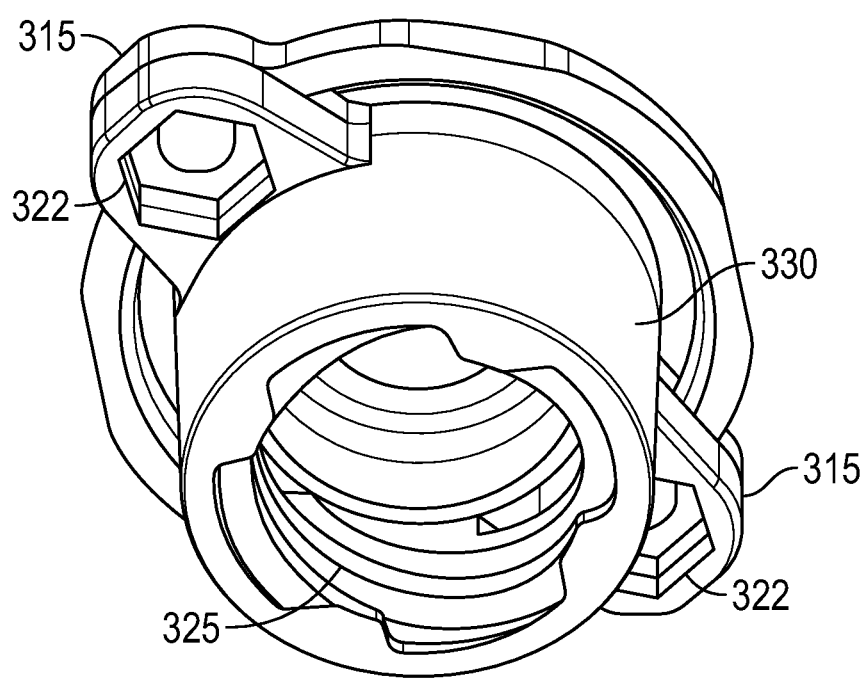

FIGS. 12a and 12b illustrate an alternate exemplary embodiment of the cap 300. As shown in FIG. 12b, the cap ends 315 have a hexagonally-shaped recessed space 322. The exemplary recessed space 322 and enables the hexagonal bolt 328 (typically threaded) as shown in FIGS. 13a-13b to fit through the holes 320 that extend from the top surface 305 of the head 310 to the bottom of the cap end 315 and allow the head of the securing bolt 328 to rest inside the recessed space 322. Once the securing bolt 328 is placed through the hole 320 and the hexagonal head of the securing bolt 328 is fitted inside the recessed space 322, the apertures 710 of the elongated channel 700 are then placed on top of the securing bolts 328 at each end of the elongated channel 700 as shown in FIG. 15. A nut is then used to secure each of the securing bolts 328 so that the elongated channel 700 is firmly in place. FIGS. 14a and 14b show alternate exemplary embodiments of that utilize hollow, threaded, hexagonal nuts 332 for receiving a threaded bolt from the top of the cap 300 to secure the elongated channel 700 to the caps 300. Hexagonal nuts 332 can be press-fit into recess 322 at the manufacturing stage so they will hold in place when installing a securing bolt 328 from the top down.

Figure 16:
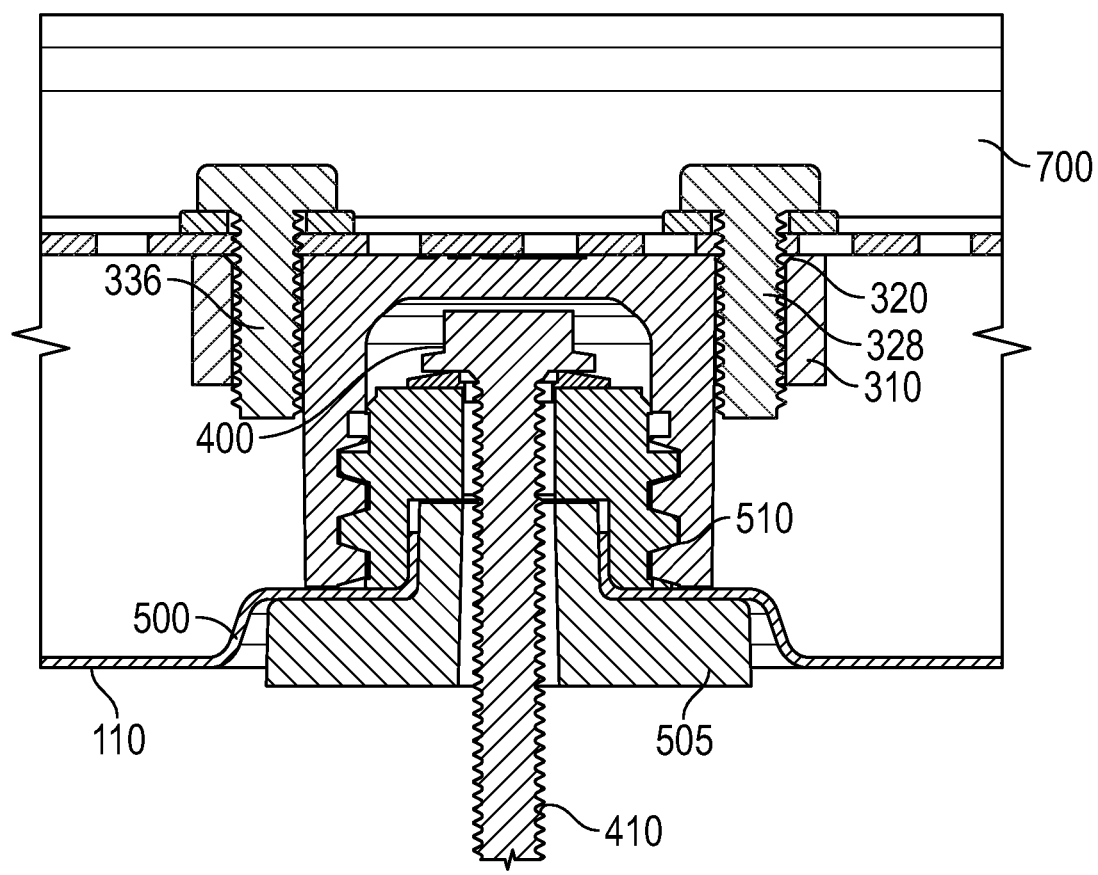

FIG. 16 shows a cross-sectional view of the installation as shown in FIG. 15 and using the caps 300 as shown in FIG. 10a with a threaded insert in holes 320, which alternatively eliminates the need for nuts 332. The illustration shows a pair of threaded bolts 328 being inserted through the holes 320 of the cap ends 315 and securing the elongated channel 700 to the top face 305 of the cap 300.

Once the assembly is completed for one cap 300, the installation steps as described above can be repeated until the elongated channel 700 is secured to the roof with the flashings 110 to form a bridge for installing multiple conduits 600.

What is claimed is:
1. An assembly for securing a conduit to a flashing comprising:
   a. a cap comprising:
      i. a head portion further comprising a recessed groove around the perimeter of the head portion;

ii. a base portion extends downward from the head portion, the base portion configured to secure the cap to a connector coupled to the flashing; and b. a substantially inverted U-shaped clamp rotatably coupled to the cap, the clamp comprising:

i. an opening;

ii. a pair of edges comprising hooks, the hooks shaped to permit the clamp to slide over an upper edge of the head portion and rotatably couple to the recessed groove;

iii. a clamping bolt comprising a saddle on an end of the clamping bolt wherein the clamping bolt is coupled to the opening and wherein the saddle is positioned within the clamp.

2. The assembly of claim 1 wherein the head portion of the cap further comprises a pair of ends, wherein each of the pair of ends further comprises a hole.

3. The assembly of claim 2 wherein the holes of the ends are threaded.

4. The assembly of claim 1 wherein the base portion has a threaded groove shaped for fastening the cap to the connector.

5. The assembly of claim 1 wherein the opening and the clamping bolt are threaded.

6. The assembly of claim 1 wherein the saddle is curved.

7. The assembly of claim 1 wherein the clamping bolt is vertically adjustable through the opening.

8. The assembly of claim 1 wherein the cap further comprises a ring that enables the cap to snap into a locked position when the cap is rotatably coupled to the flashing.

* * * * *